(12) United States Patent
Hoffer

(10) Patent No.: US 6,564,536 B1
(45) Date of Patent: May 20, 2003

(54) COMBINE HEADER ATTACHMENT SYSTEM

(76) Inventor: Rod Hoffer, P.O. Box 183, Winner, SD (US) 57580

( * ) Notice: Subject to any disclaimer, the term of this patent is extended or adjusted under 35 U.S.C. 154(b) by 0 days.

(21) Appl. No.: 09/948,744

(22) Filed: Sep. 7, 2001

(51) Int. Cl.[7] .............................................. A01D 45/02
(52) U.S. Cl. ................... 56/119; 56/84; 56/126
(58) Field of Search ............................ 56/119, 314, 126, 56/84, 94, 329, 330

(56) References Cited

U.S. PATENT DOCUMENTS

| | | | |
|---|---|---|---|
| 911,017 A | 1/1909 | Kouns | |
| D163,773 S | 6/1951 | Schmid | |
| 2,867,961 A | 1/1959 | Heilbrun | |
| 3,959,958 A | * 6/1976 | Bontrager | ................ 56/314 |
| 4,269,018 A | * 5/1981 | Pickett | ................ 56/119 |
| 4,358,921 A | 11/1982 | Pustejovsky | |
| 4,584,825 A | 4/1986 | Atkinson | |
| 4,633,657 A | 1/1987 | Arnold | |
| 4,843,806 A | 7/1989 | Klinner | |
| 5,806,292 A | * 9/1998 | Luecke | ................ 56/119 |
| 6,032,445 A | 3/2000 | Heintzman | |
| 6,244,026 B1 | * 6/2001 | Minnihan et al. | ........... 56/119 |

* cited by examiner

Primary Examiner—Arpád Fáb Kovács
(74) Attorney, Agent, or Firm—Kaardal & Leonard LLP

(57) ABSTRACT

A combine header attachment system for preventing grain and crop heads from falling onto the ground when the crops are being combined. The combine header attachment system includes a plurality of brace members each being designed for coupling to a header of a combine. Each of a plurality of channel members are coupled to an associated one of the brace members. Each of the channel members has a hook portion. The hook portion of each of the channel members extends from a free end of an associated one of the channel members. The hook portion of each of the channel members is for inhibiting the crop heads from falling off of the free end of the associated one of the channel members.

19 Claims, 3 Drawing Sheets

COMBINE HEADER ATTACHMENT SYSTEM

BACKGROUND OF THE INVENTION

1. Field of the Invention

The present invention relates to combine header grain catch pans and more particularly pertains to a new combine header attachment system preventing grain and crop heads from falling onto the ground when the crops are being combined.

2. Description of the Prior Art

The use of combine header grain catch pans is known in the prior art. More specifically, combine header grain catch pans heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,032,445; U.S. Pat. No. 4,633,657; U.S. Pat. No. 4,358,921; U.S. Pat. No. 4,584,825; U.S. Pat. No. 4,843,806; U.S. Pat. No. 2,867,961; U.S. Pat. No. 911,017; and U.S. Pat. No. Des. 163,773.

While these devices fulfill their respective, particular objectives and requirements, the aforementioned patents do not disclose a new combine header attachment system. The inventive device includes a plurality of brace members each being designed for coupling to a header of a combine. Each of a plurality of channel members are coupled to an associated one of the brace members. Each of said channel members has a hook portion. The hook portion of each of the channel members extends from a free end of an associated one of the channel members, The hook portion of each of the channel members is for inhibiting the crop heads from falling off of the free end of the associated one of the channel members.

In these respects, the combine header attachment system according to the present invention substantially departs from the conventional concepts and designs of the prior art, and in so doing provides an apparatus primarily developed for the purpose of preventing grain and crop heads from falling onto the ground when the crops are being combined

SUMMARY OF THE INVENTION

In view of the foregoing disadvantages inherent in the known types of combine header grain catch pans now present in the prior art, the present invention provides a new combine header attachment system construction wherein the same can be utilized for preventing grain and crop heads from falling onto the ground when the crops are being combined.

The general purpose of the present invention, which will be described subsequently in greater detail, is to provide a new combine header attachment system apparatus and method which has many of the advantages of the combine header grain catch pans mentioned heretofore and many novel features that result in a new combine header attachment system which is not anticipated, rendered obvious, suggested, or even implied by any of the prior art combine header grain catch pans, either alone or in any combination thereof.

To attain this, the present invention generally comprises a plurality of brace members each being designed for coupling to a header of a combine. Each of a plurality of channel members are coupled to an associated one of the brace members. Each of said channel members has a hook portion. The hook portion of each of the channel members extends from a free end of an associated one of the channel members, The hook portion of each of the channel members is for inhibiting the crop heads from falling off of the free end of the associated one of the channel members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combine header attachment system apparatus and method which has many of the advantages of the combine header grain catch pans mentioned heretofore and many novel features that result in a new combine header attachment system which is not anticipated, rendered obvious, suggested, or even implied by any of the prior art combine header grain catch pans, either alone or in any combination thereof.

It is another object of the present invention to provide a new combine header attachment system which may be easily and efficiently manufactured and marketed.

It is a further object of the present invention to provide a new combine header attachment system which is of a durable and reliable construction.

An even further object of the present invention is to provide a new combine header attachment system which is susceptible of a low cost of manufacture with regard to both materials and labor, and which accordingly is then susceptible of low prices of sale to the consuming public, thereby making such combine header attachment system economically available to the buying public.

Still yet another object of the present invention is to provide a new combine header attachment system which provides in the apparatuses and methods of the prior art some of the advantages thereof, while simultaneously overcoming some of the disadvantages normally associated therewith.

Still another object of the present invention is to provide a new combine header attachment system for preventing grain and crop heads from falling onto the ground when the crops are being combined.

Yet another object of the present invention is to provide a new combine header attachment system which includes a plurality of brace members each being designed for coupling to a header of a combine. Each of a plurality of channel members are coupled to an associated one of the brace members. Each of said channel members has a hook portion. The hook portion of each of the channel members extends from a free end of an associated one of the channel members. The hook portion of each of the channel members is for inhibiting the crop heads from falling off of the free end of the associated one of the channel members.

Still yet another object of the present invention is to provide a new combine header attachment system that prevents grain and crop heads from falling onto the ground and being wasted when the crops are being combined.

Even still another object of the present invention is to provide a new combine header attachment system that provides for greater yield of crops when combining the crops.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
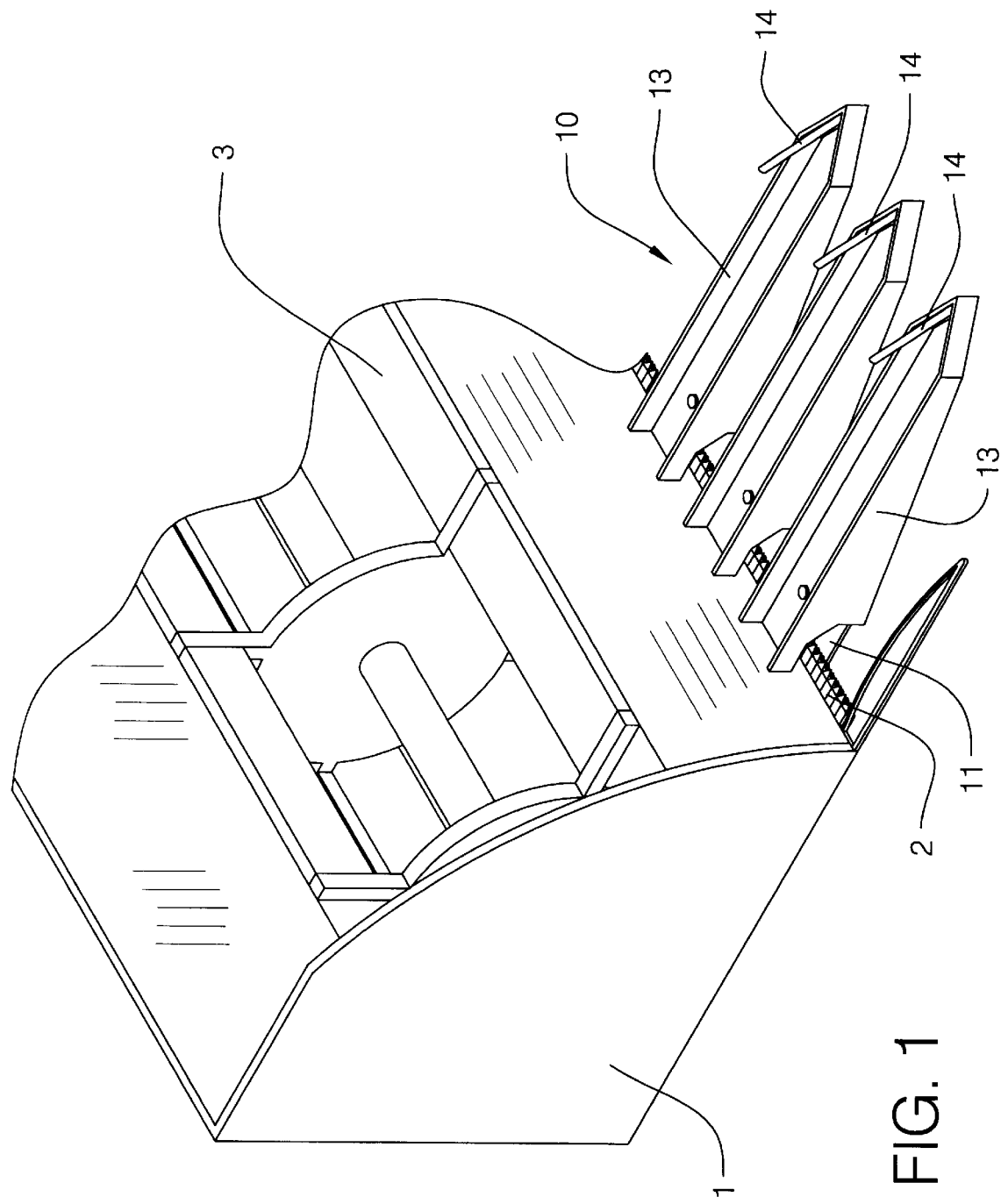
FIG. 1 is an isometric view of a new combine header attachment system according to the present invention.
Figure 2:
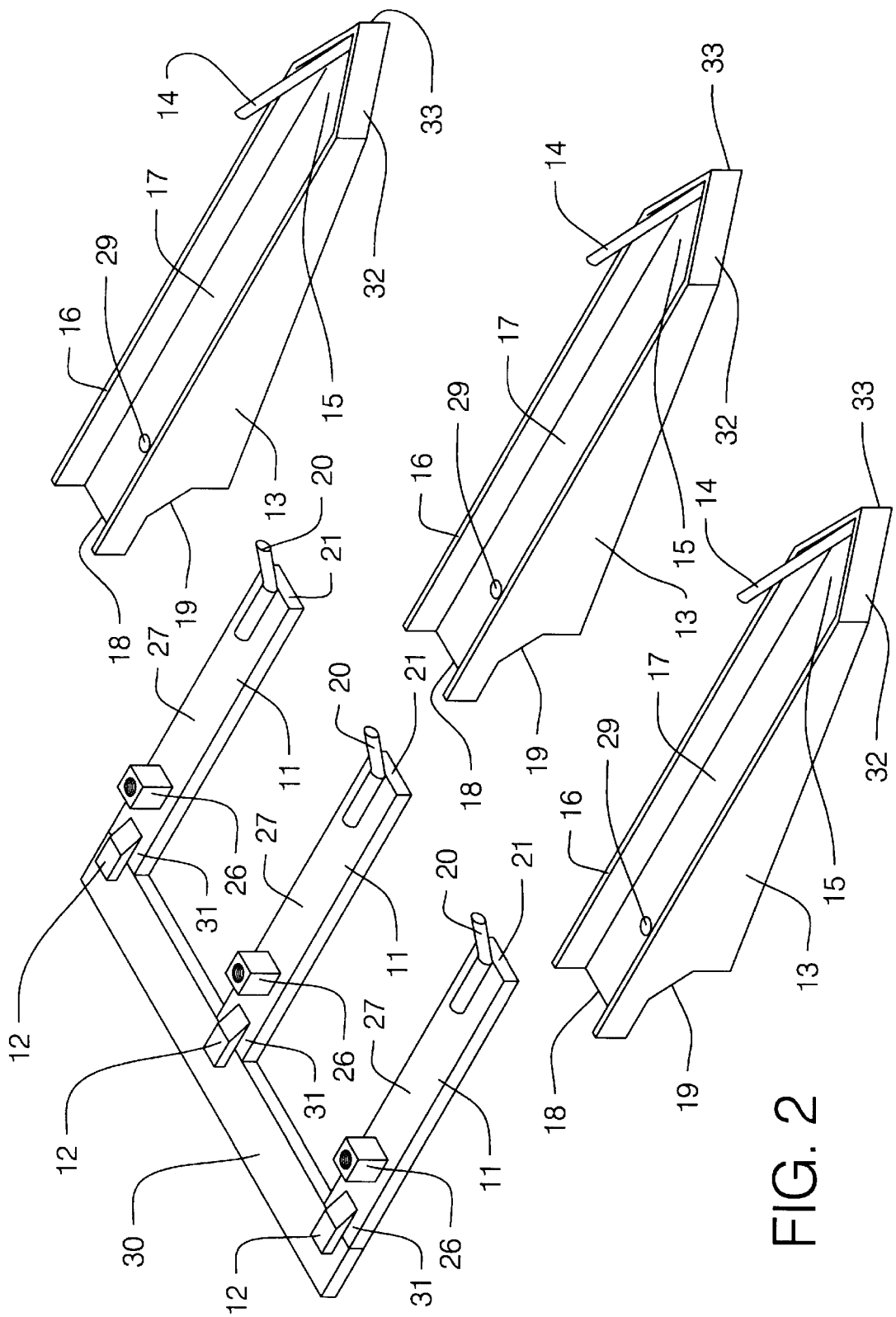
FIG. 2 is an exploded isometric view of the present invention.
Figure 3:
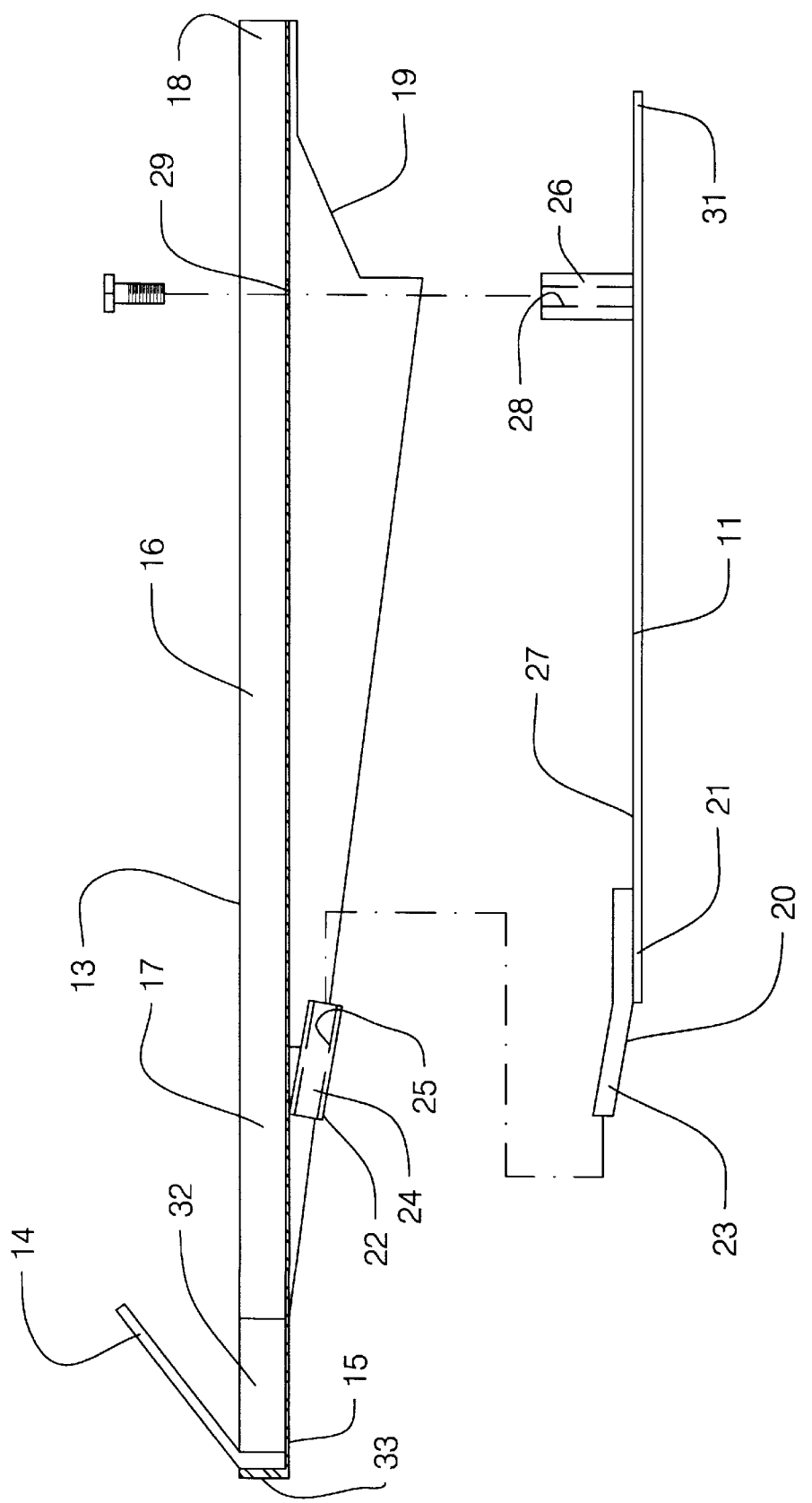
FIG. 3 is a cross-sectional view of the present invention.

With reference now to the drawings, and in particular to FIGS. 1 through 3 thereof, a new combine header attachment system embodying the principles and concepts of the present invention and generally designated by the reference numeral 10 will be described.

As best illustrated in FIGS. 1 through 3, the combine header attachment system 10 generally comprises a plurality of brace members 11 each having a mounting portion 12. The mounting portion 12 of each of the brace members 11 are coupled to a header 1 of a combine such that each of the brace members 11 are positioned below a cutter bar 2 of the header 1 of the combine. The brace members 11 have a spaced relationship along a length of the header 1 such that the brace members 11 do not block access to the crops by the cutter bar 2 when the crops are being harvested by the combine.

A plurality of channel members 13 each being couplable to one of the brace members 11. Each of the channel members 13 are designed for catching crop heads that are missed by a pick up reel 3 of the combine and guiding the crop heads towards an auger of the header 1 of the combine. Each of the channel members 13 inhibits the crop heads from being lost from the header 1 of the combine. Each of the channel members 13 has a hook portion 14 backwardly extending from a free end 15 of an associated one of the channel members 13 such that the hook portion 14 of each of each of the channel members 13 prevents the crops heads from falling off of the free end 15 of the channel member.

The channel member has a perimeter wall 16 defining a channel 17. The channel 17 has an open end 18 opposite the free end 15 of each of the channel members 13 such that the open end 18 of the channel 17 permits movement of the crop heads from the channel 17 of the associated one of the channel members 13 to the header 1 of the combine. The perimeter wall 16 of each of the channel members 13 has a pair of cutouts 19. Each of the cutouts 19 are positioned opposite the free end 15 of an associated one of the channel members 13. Each of the cutouts are designed for permitting free movement of the cutter bar 2 between the channel members 13 and the brace members 11 when the brace members 11 are coupled to the header 1 of the combine and the channel members 13 are coupled to the brace members 11.

Each of the brace members 11 has a bracing portion 20. The bracing portion 20 of each of the brace members 11 extends from a distal end 21 of an associated one of the brace members 11. The bracing portion 20 of each of the brace members 11 is for supporting the free end 15 of an associated one of the channel members 13 when the channel members 13 are coupled to the brace members 11.

Each of the channel members 13 has a receiving portion 22. The receiving portion 22 of each of the channel members 13 receives the bracing portion 20 of an associated one of the brace members 11 when the channel members 13 are coupled to the brace members 11. The receiving portion 22 of each of the channel members 13 are for securing the associated one of the channel members 13 to the bracing portion 20 of the associated one of the brace members 11. The bracing portion 20 of each of the brace members 11 comprises a rod 23. The receiving portion 22 of each of the channel members 13 comprises a sleeve 24. The sleeve 24 has a bore 25 extending through the sleeve 24 of the associated one of the channel members 13 such that the rod 23 of each of the brace members 11 is selectively insertable within the sleeve 24 of the respective one of the channel members 13 when the channel members 13 are coupled to the brace members 11.

Each of the brace members 11 has a support member 26. The support member 26 of each of the brace members 11 upwardly extends from an upper surface 27 of an associated one of the brace members 11. The support member 26 of each of the brace members 11 is positioned between one of the brace members 11 and an associated one of the channel members 13 for providing additional support to the associated one of the channel members 13 when the channel members 13 are coupled to the brace members 11.

The support member 26 of each of the brace members 11 has an orifice 28 extending through the support member 26. Each of the channel members 13 has an aperture 29 extending through the associated one of the channel members 13. The aperture 29 of the associated one of the channel members 13 is aligned with the orifice 28 of the support member 26 when the channel members 13 are coupled to the brace members 11. The orifice 28 of each of the brace members 11 is designed for receiving a fastener such that the fastener extends through the aperture 29 of the channel members 13 and the orifice 28 of the support members 26 of the brace members 11 securing the channel members 13 to the brace members 11.

A connection member 30 is coupled to the plurality of the brace members 11. The connection member 30 is positioned at a proximal end 31 of each of the brace members 11. The connection member 30 is designed for coupling to the header 1 of the combine such that the brace members 11 outwardly extend from the header 1 of the combine.

The free end 15 of each of the channel members 13 has a tapered portion 32. The tapered portion of each of the channel members 13 tapers to an apex 33. The tapered portion 32 of each of the channel members 13 is designed for guiding the crops around the associated one of the channel members 13 and into the cutter bar 2 of the header 1 of the combine.

In use, the user connects the brace members under the cutter bar of the header of the combine. The user then couples one of the channel members to each of the brace members. As the user is harvesting the channel members catch any crop heads that may not be captured by the header when the stalks are cut by the cutter bar. The hook portion of each of the channel members is for catching crop heads that may be deflected out of the header for harvesting those crop heads and reducing the amount of crop heads that fall to the ground and are not harvested.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combine header attachment system for collecting crop heads that may fall to the ground and be wasted, the combine header system apparatus comprising:
   a plurality of brace members each being adapted or coupling to a header of a combine;
   a plurality of channel members each being couplable to an associated one of said brace members;
   a each of said channel members having a hook portion, said hook portion of each channel members extending from a free end of an associated one of said channel members for inhibiting the crop heads from falling off of said free end of the associated one of said channel members; and
   said channel member having a perimeter wall, said perimeter wall of said channel member having a pair of cutouts, each of said cutouts being positioned opposite said free end of an associated one of said channel members, each of said cutouts being adapted for permitting free movement of a cutter bar between said channel members and said brace members when said brace members are coupled to the header of the combine and said channel members are coupled to said brace members.

2. The combine header attachment system as set forth in claim 1, further comprising:
   said channel member having the perimeter wall defining a channel, said channel having an open end opposite said free end of said channel member such that said open end of said channel permits movement of the crop heads from said channel of said channel member to the header of the combine.

3. The combine header attachment system as set forth in claim 1, further comprising:
   each of said brace members having a bracing portion, said bracing portion of each of said brace members extending from a distal end of an associated one of said brace members, said bracing portion of each of said brace members being for supporting said free end of an associated one of said channel members when said channel members are coupled to said brace members.

4. The combine header attachment system as set forth in claim 3, further comprising:
   each of said channel members having a receiving portion, said receiving portion of each of said channel members receiving said bracing portion of an associated one of said brace members when said channel members are coupled to said brace members, said receiving portion of each of said channel members are for securing the associated one of said channel members to said bracing portion of the associated one of said brace members.

5. The combine header attachment system as set forth in claim 4, further comprising:
   said bracing portion of each of said brace members comprising a rod; and
   said receiving portion of each of said channel members comprising a sleeve, said sleeve having a bore extending through said sleeve of the associated one of said channel members such that said rod of each of said brace members is selectively insertable within said sleeve of the respective one of said channel members when said channel members are coupled to said brace members.

6. The combine header attachment system as set forth in claim 1, further comprising:
   each of said brace members having a support member, said support member of each of said brace members upwardly extending from an upper surface of an associated one of said brace members, said support member of each of said brace members being positioned between one of said brace members and an associated one of said channel members for providing additional support to the associated one of said channel members when said channel members are coupled to said brace members.

7. The combine header attachment system as set forth in claim 6, further comprising:
   said support member of each of said brace members having an orifice extending through said support member; and
   each of said channel members having an aperture extending through the associated one of said channel members, said aperture of the associated one of said channel members being aligned with said orifice of said support member when said channel members are coupled to said brace members, said orifice of each of said brace members being adapted for receiving a fastener such that the fastener extends through said aperture of said channel members and said orifice of said support members of said brace members securing said channel members to said brace members.

8. The combine header attachment system as set forth in claim 1, further comprising:

a connection member being coupled to said plurality of said brace members, said connection member being positioned at a proximal end of each of said brace members, said connection member being adapted for coupling to the header of the combine such that said brace members outwardly extend from the header of the combine.

9. The combine header attachment system as set forth in claim 1, further comprising:

said free end of each of said channel members having a tapered portion, said tapered portion of each of said channel members tapering to an apex, said tapered portion of each of said channel members being adapted for guiding the crops around the associated one of said channel members and into the cutter bar of the header of the combine.

10. The combine header attachment system as set forth in claim 1, further comprising:

each of said brace members having a mounting portion, said mounting portion of each of said brace members being adapted for coupling to the header of the combine such that each of said brace members is positioned below the cutter bar of the header of the combine, said brace members having a spaced relationship along a length of the header such that said brace members do not block access to the crops by the cutter bar when the crops are being harvested by the combine.

11. A combine header attachment system for collecting crop heads that may fall to the ground and be wasted, the combine header system apparatus comprising:

a plurality of brace members each having a mounting portion, said mounting portion of each of said brace members being adapted for coupling to a header of a combine such that each of said brace members is positioned below a cutter bar of the header of the combine, said brace members having a spaced relationship along a length of the header such that said brace members do not block access to the crops by the cutter bar when the crops are being harvested by the combine;

a plurality of channel members each being couplable to one of said brace members, each of said channel members being adapted for catching crop heads that are missed by a pick up reel of the combine and guiding the crop heads towards the auger of the header of the combine such that each of said channel members is for inhibiting the crop heads from being lost from the header of the combine, each of said channel members having a hook portion backwardly extending from a free end of an associated one of said channel members such that said hook portion of each of each of said channel members prevents the crops heads from falling off of said free end of said channel member;

said channel member having a perimeter wall defining a channel, said channel having an open end opposite said free end of said channel member such that said open end of said channel permits movement of the crop heads from said channel of said channel member to the header of the combine;

said perimeter wall of said channel member having a pair of cutouts, each of said cutouts being positioned opposite said free end of an associated one of said channel members, each of said cutouts being adapted for permitting free movement of the cutter bar between said channel members and said brace members when said brace members are coupled to the header of the combine and said channel members are coupled to said brace members;

each of said brace members having a bracing portion, said bracing portion of each of said brace members extending from a distal end of an associated one of said brace members, said bracing portion of each of said brace members being for supporting said free end of an associated one of said channel members when said channel members are coupled to said brace members;

each of said channel members having a receiving portion, said receiving portion of each of said channel members receiving said bracing portion of an associated one of said brace members when said channel members are coupled to said brace members, said receiving portion of each of said channel members are for securing the associated one of said channel members to said bracing portion of the associated one of said brace members;

said bracing portion of each of said brace members comprising a rod;

said receiving portion of each of said channel members comprising a sleeve, said sleeve having a bore extending through said sleeve of the associated one of said channel members such that said rod of each of said brace members is selectively insertable within said sleeve of the respective one of said channel members when said channel members are coupled to said brace members;

each of said brace members having a support member, said support member of each of said brace members upwardly extending from an upper surface of an associated one of said brace members, said support member of each of said brace members being positioned between one of said brace members and an associated one of said channel members for providing additional support to the associated one of said channel members when said channel members are coupled to said brace members;

said support member of each of said brace members having an orifice extending through said support member;

each of said channel members having an aperture extending through the associated one of said channel members, said aperture of the associated one of said channel members being aligned with said orifice of said support member when said channel members are coupled to said brace members, said orifice of each of said brace members being adapted for receiving a fastener such that the fastener extends through said aperture of said channel members and said orifice of said support members of said brace members securing said channel members to said brace members;

a connection member being coupled to said plurality of said brace members, said connection member being positioned at a proximal end of each of said brace members, said connection member being adapted for coupling to the header of the combine such that said brace members outwardly extend from the header of the combine; and said free end of each of said channel members having a tapered portion, said tapered portion of each of said channel members tapering to an apex, said tapered portion of each of said channel members being adapted for guiding the crops around the associated one of said channel members and into the cutter bar of the header of the combine.

12. A combine header attachment system for collecting crop heads that may fall to the ground and be wasted, the combine header system apparatus comprising:

a plurality of brace members each being adapted or coupling to a header of a combine;

a plurality of channel members each being couplable to an associated one of said brace members;

each of said channel members having a hook portion, said hook portion of each channel members extending from a free end of an associated one of said channel members for inhibiting the crop heads from falling off of said free end of the associated one of said channel members;

each of said brace members having a support member, said support member of each of said brace members upwardly extending from an upper surface of an associated one of said brace members, said support member of each of said brace members being positioned between one of said brace members and an associated one of said channel members for providing additional support to the associated one of said channel members when said channel members are coupled to said brace members;

said support member of each of said brace members having an orifice extending through said support member; and each of said channel members having an aperture extending through the associated one of said channel members, said aperture of the associated one of said channel members being aligned with said orifice of said support member when said channel members are coupled to said brace members, said orifice of each of said brace members being adapted for receiving a fastener such that the fastener extends through said aperture of said channel members and said orifice of said support members of said brace members securing said channel members to said brace members.

13. The combine header attachment system as set forth in claim 12, further comprising:

said channel member having a perimeter wall defining a channel, said channel having an open end opposite said free end of said channel member such that said open end of said channel permits movement of the crop heads from said channel of said channel member to the header of the combine.

14. The combine header attachment system as set forth in claim 12, further comprising:

each of said brace members having a bracing portion, said bracing portion of each of said brace members extending from a distal end of an associated one of said brace members, said bracing portion of each of said brace members being for supporting said free end of an associated one of said channel members when said channel members are coupled to said brace members.

15. The combine header attachment system as set forth in claim 14, further comprising:

each of said channel members having a receiving portion, said receiving portion of each of said channel members receiving said bracing portion of an associated one of said brace members when said channel members are coupled to said brace members, said receiving portion of each of said channel members are for securing the associated one of said channel members to said bracing portion of the associated one of said brace members.

16. The combine header attachment system as set forth in claim 15, further comprising:

said bracing portion of each of said brace members comprising a rod; and said receiving portion of each of said channel members comprising a sleeve, said sleeve having a bore extending through said sleeve of the associated one of said channel members such that said rod of each of said brace members is selectively insertable within said sleeve of the respective one of said channel members when said channel members are coupled to said brace members.

17. The combine header attachment system as set forth in claim 12, further comprising:

a connection member being coupled to said plurality of said brace members, said connection member being positioned at a proximal end of each of said brace members, said connection member being adapted for coupling to the header of the combine such that said brace members outwardly extend from the header of the combine.

18. A The combine header attachment system as set forth in claim 12, further comprising:

said free end of each of said channel members having a tapered portion, said tapered portion of each of said channel members tapering to an apex, said tapered portion of each of said channel members being adapted for guiding the crops around the associated one of said channel members and into the cutter bar of the header of the combine.

19. The combine header attachment system as set forth in claim 12, further comprising:

each of said brace members having a mounting portion, said mounting portion of each of said brace members being adapted for coupling to the header of the combine such that each of said brace members is positioned below a cutter bar of the header of the combine, said brace members having a spaced relationship along a length of the header such that said brace members do not block access to the crops by the cutter bar when the crops are being harvested by the combine.

* * * * *